United States Patent [19]
Kosuge et al.

[11] 3,909,294
[45] Sept. 30, 1975

[54] VIBRATION-PROOF BATTERY

[75] Inventors: Takashi Kosuge; Ichiro Sano, both of Yokohama, Japan

[73] Assignee: Furukawa Denchi Kabushiki Kaisha, Yokohama, Japan

[22] Filed: Mar. 1, 1973

[21] Appl. No.: 337,276

[52] U.S. Cl. ................................ 136/81
[51] Int. Cl. .............................. H01m 1/04
[58] Field of Search ................... 136/79–81, 136/170, 166, 176

[56] References Cited
UNITED STATES PATENTS

| | | | |
|---|---|---|---|
| 914,646 | 3/1909 | Ekstromer | 136/81 X |
| 1,874,404 | 8/1932 | Wood | 136/80 |
| 1,992,817 | 2/1935 | Dunzweiler | 136/81 |
| 2,051,297 | 8/1936 | Haupt | 136/81 |

*Primary Examiner*—Anthony Skapars
*Attorney, Agent, or Firm*—Waters, Schwartz & Nissen

[57] ABSTRACT

A vibration-proof battery of the type including an electrode plate group holding member adapted to compress from above an electrode plate group positioned on a rest and contained in a battery casing, the holding member being formed so as to have along its lower edge comb teeth-shaped projections and being arranged whereby each of the projections compresses the upper edge of a corresponding one of positive and negative electrode plates constituting the electrode plate group.

3 Claims, 2 Drawing Figures

VIBRATION-PROOF BATTERY

FIELD OF THE INVENTION

The present invention relates to batteries and, more particularly, to a battery having improved vibration-proof characteristics adapted to be utilized for motorcycles or the like.

DISCUSSION OF THE PRIOR ART

A vibration-proof battery for motorcycles or the like is presently known which, in order to prevent upward and downward vibration of each respective electrode plate group thereof, provides for respectively a positive strap interconnecting a positive electrode plate group and a negative strap interconnecting a negative electrode plate group, each being pressed from above so as to be retained by suitable holding members extending downwardly from a cover portion of a battery casing. The prior art type of battery is, however, defective in that, since the positive electrode plate group and the negative electrode plate group are each individually subjected to pressure through their respective straps, a one-sided compressive effect is exerted on each positive electrode plate and on each negative electrode plate of the groups so as to cause, during upward and downward vibration, a relative mutual displacement between the negative electrode plate group and the positive electrode plate group. Consequently, the pressing and retaining action exerted on the collective electrode plate group becomes imperfect and erratic. Furthermore, this may create the danger of causing a short-circuit through the movement of battery plate separator and moreover, ears formed on the electrode plates may be broken through vibration.

SUMMARY OF THE INVENTION

It is, accordingly, an object of the present invention to provide an improved vibration-proof battery of the type described, which is free from the defects encountered in the prior art, wherein each electrode plate group thereof is rigidly fastened by a compressive force, and with the entire electrode plate group being immovable retained even during intervals of upward and downward vibration.

According to the present invention there is provided, in a vibration-proof battery of the type described an electrode plate group holding or retaining member adapted to rigidly fasten an electrode plate group by imparting pressure thereto from above, with the plate group being located on a support rest and contained in a battery casing, the holding member being attached to the casing and formed so as to have along its lower edge suitable comb teeth-shaped projections, and being arranged so that each of the projections presses against the upper edge of a corresponding one of positive and negative electrode plates collectively constituting each of electrode plate groups.

BRIEF DESCRIPTION OF THE DRAWING

Reference may now be had to the following detailed description of exemplary embodiments of the present inventive vibration-proof battery, taken in conjunction with the accompanying drawings, in which.

DETAILED DESCRIPTION

Figure 1:
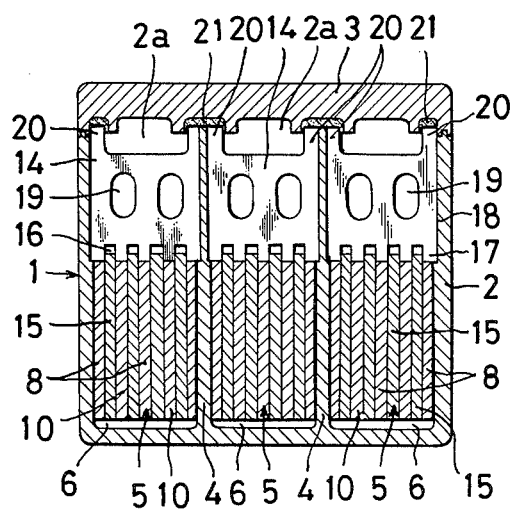
FIG. 1 is an elevational side view, in section, of one embodiment of a battery according to the present invention.
Figure 2:
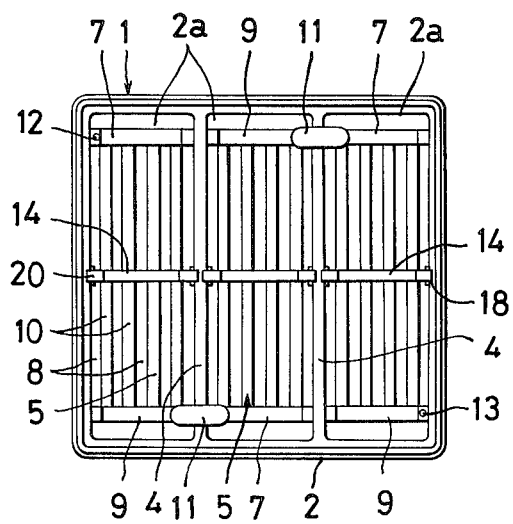
FIG. 2 is a top plan view of the battery of FIG. 1, illustrated with its cover removed for purposes of clarity.

Referring now to the drawing, numeral 1 denotes a synthetic resin battery casing comprising a battery container portion 2 and a battery cover portion 3 adapted to be secured in an air-and-liquid tight manner to the upper edge surface of the container portion through a suitable sealing agent. The interior of the battery container 2 is divided by partition walls 4 into three cell containers 2a, and an electrode plate group 5 is mounted in each cell container 2a and positioned on a rest 6. A negative strap 7 interconnects negative electrode plates 8 at their ear portions, while a positive strap 9 interconnects positive electrode plates 10 at their ear portions. The negative strap 7 and the positive strap 9 in adjacent cell containers 2a, 2a are interconnected by a U-shaped cell-bridging strap 11 which extends over the partition wall 4. The three electrode plate groups 5, which are thus connected in series, are electrically connected to the exterior of the casing through negative and positive terminal posts 12,13 provided on the oppositely located endmost straps.

According to the invention, in order to completely immovably fasten each of the electrode plate groups 5 against vibration, a holding member 14 for imparting pressure thereto from above and retain the plate groups is located on the upper end thereof within each cell container 2a. In effect, each holding member 14 consists of, for example, a plate-shaped synthetic-resinous molded member formed independently of the battery casing 1 and being almost equal in width to the width of the space for insertion of the electrode plate group into each of the cell containers 2a, having comb teeth-shaped projections 17 in a quantity corresponding to the number of the negative and positive electrode plates 8, 10 constituting the electrode plate group 5, and having therebetween recessed space portions 16, each adapted to receive a separator 15, previously formed along one edge thereof. The plate-shaped holding member 14 is inserted in press-fit relationship into each cell container 2a until the comb teeth-shaped lower edge thereof is in contact with the upper edge surface of the electrode plate group 5. In this instance, the holding member 14 may have applied to its plate group contacting edge portions an adhesive agent, a sealing agent or the like, so as to be rigidly fastened to the cell container 2a. Thus, the projections 17 on the lower edge of the plate-shaped holding member 14 are adapted to press from above against the upper edges of all of the negative and positive electrode plates 8, 10 of the electrode plate group 5, whereby the fastening thereof is effected firmly and strongly. The holding or retaining position for the electrode plate upper edges by the holding member 14 lies between the positive and negative straps 7, 9 in each cell container 2a, in effect, at the intermediate portion of the electrode plate upper edges, in view of which the pressing and fastening of the plate groups can be effected extremely effectively and stably. It is ordinarily preferable that, as illustrated, each holding member 14 is inserted so as to extend along the longitudinal center line of the battery casing 1, whereby each electrode plate is pressed along its upper edge center portion. Under this compressive condition, the upper projecting edge of each separator 15 is received by the corresponding recessed portion 16 between the projections 17,17 so that the separator 15 is not damaged thereby and is safely retained. A pair of vertical guide grooves 18 for insertion of the holding member 14 are formed along the inner surfaces of the opposite side walls of each cell container 2a, so as to assure the insertion of the holding member 14 at a predetermined position. A liquid passage opening 19 is made in the holding member 14, so as to permit battery electrolyte to flow to the opposite sides of the member 14 in order to maintain the battery operation in a good operating condition. The battery cover portion 3 is provided at its rear surface with a number of recesses 21 for receiving the upper projecting edges 20 of the holding member 14 upon closing of the cover portion 3, each upper edges 20 being embedded in a sealing agent applied to the recess 21 so as to obtain thereby an air- and-liquid tight covering connection between the cell containers 2,2 in that region thereof.

The holding member 14, in the embodiment, is in compressive contact or connected with the opposite inner side walls of the cell container so as to concurrently form a reinforcement member for the battery cell container, which may be of comparatively small thickness.

Thus, according to the invention, each of the comb teeth-shaped projections formed along the lower side edge of the holding member inserted on the upper surface of the electrode plate group which is located on the rest and contained in the battery casing, compresses and fixes the upper edge of the corresponding one of the positive and negative electrode plates of the electrode plate group, so that each electrode plate is directly compressed along its upper edge by each projection, so as to positively eliminate or prevent vibration of the electrode plate group, and the vibration-proof characteristics of the battery is greatly enhanced.

While there has been shown what is considered to be the preferred embodiment of the invention, it will be obvious that modifications may be made which come within the scope of the disclosure of the specification.

What we claim is:

1. A vibration-proof battery comprising a battery casing having a bottom wall and upstanding side walls; a casing cover adapted to be supported along the upper edge surfaces of said side walls; at least one electrode plate group having a plurality of vertically extending spaced electrode plates being positioned in said battery casing; and an electrode plate group holding means being positioned above and extending across said electrode plate group, said holding means having a plurality of comb teeth-shaped depending projections formed along its lower edge, each of said projections being in alignment and in contact with each end surface of the positive and negative electrodes of said electrode group, the upper edge surface of said holding means having upper projecting edges adapted to be engaged through adhesive agent in recesses of said casing cover upon positioning of the latter upon said electrode plates and maintain said electrode plate group in rigidly fixed relationship within said casing, the adhesive means being interposed between said casing cover and the upper projecting edges of the holding means so as to maintain said cover and said holding means in permanently fastened relationship; groove means formed in at least two opposite inner side wall surfaces of said battery casing, said holding means having end portions adapted to be engaged in said groove means and forming a reinforcement for said battery casing; each said holding means extending across the center portion of each of said electrode plate group.

2. A battery as claimed in claim 1, comprising a plurality of transversely extending spaced partition walls being positioned in said casing forming a plurality of electrode plate group-receiving cells, each said cell having an electrode plate group positioned therein; and a plurality of said holding means spanning one each respectively one of said electrode plate groups.

3. A battery as claimed in claim 1, said holding means being formed of a molded resinous plastic material.

* * * * *